United States Patent [19]

Mottate

[11] Patent Number: 4,647,226
[45] Date of Patent: Mar. 3, 1987

[54] LINEAR MOTION ROLLING-CONTACT BEARING ASSEMBLY

[75] Inventor: Tatsuo Mottate, Mitaka, Japan

[73] Assignee: Nippon Thompson Co., Ltd., Tokyo, Japan

[21] Appl. No.: 804,205

[22] Filed: Dec. 2, 1985

[30] Foreign Application Priority Data

Dec. 3, 1984 [JP] Japan ............................ 59-254067

[51] Int. Cl.$^4$ .......................................... F16C 29/06
[52] U.S. Cl. .................................................. 384/45
[58] Field of Search ................... 384/45, 43, 44; 4/168

[56] References Cited

U.S. PATENT DOCUMENTS

| | | | |
|---|---|---|---|
| 3,845,993 | 11/1974 | Schiler | 384/45 |
| 4,432,587 | 2/1984 | Bryan | 384/45 |
| 4,557,530 | 12/1985 | Haase | 384/45 |
| 4,572,590 | 2/1986 | Teramachi | 384/45 |

Primary Examiner—Lenard A. Footland

Attorney, Agent, or Firm—Alan H. MacPherson; Steven F. Caserza; Richard Franklin

[57] ABSTRACT

A linear motion rolling-contact bearing assembly includes a trough-shaped rail extending straight over a length and provided with outer guide grooves, a slider member provided with inner guide grooves each opposite to the corresponding one of the outer guide grooves and including an endless circulating path comprised of a load path section and non-load path section, a plurality of balls arranged in the endless circulating path which are brought into rolling contact with the corresponding pair of the inner and outer guide grooves at the load path section, and a retainer plate for retaining the balls in the endless circulating path while rolling along its load section. In accordance with the present invention, the slider member, received in the rail, includes a saddle-shaped table and a pair of upper and lower wall sections, which define therein at least the non-load path section of the endless circulating path and which are fixedly attached to the table by a fixing means, such as rivets.

15 Claims, 14 Drawing Figures

LINEAR MOTION ROLLING-CONTACT BEARING ASSEMBLY

BACKGROUND OF THE INVENTION

1. Field of the Invention

This invention relates to a linear motion bearing assembly capable of providing an infinite linear motion, and, in particular, to a linear motion rolling-contact bearing assembly.

2. Description of the Prior Art

A linear motion rolling-contact bearing assembly is well known in the art. Typically, such a bearing assembly includes a generally trough-shaped guide rail extending straight, a slider member which slidingly moves along the rail and a plurality of rolling members interposed between the slider member and the rail thereby providing a smooth running motion to the slider member. In this bearing assembly, there is normally defined a pair of endless circulating paths between the slider member and the rail each endless circulating path including a load section defined interposed between the slider member and the rail and a non-load section defined generally inside of the slider member by the remaining section of the endless circulating path. The rolling members are provided in the endless circulating paths so that the rolling members roll therealong indefinitely thereby providing an indefinite relative motion between the slider member and the rail.

In such linear motion rolling-contact bearing assemblies, balls or rollers are often used as the rolling members; and, the sliding members and/or rail are often formed from a thin steel plate. A typical linear motion rolling-contact bearing assembly using balls as the rolling members and formed from thin steel plates into desired shapes by plastic deformation is disclosed in Japanese Utility Model, Post-Publication No. 54-34093. Such a linear motion rolling-contact bearing assembly is light in weight, easy to fabricate and thus low in cost; however, it lacks rigidity and accuracy so that its applications tend to be rather limited. It is true that thick steel plates may be used to fabricate such a bearing assembly to obtain an enhanced rigidity and accuracy, but this brings about other disadvantages, such as excessive weight, short stroke, and bulkiness. In addition, since its weight becomes greater, its inertia also becomes greater, which prohibits applications which require high speed operation.

SUMMARY OF THE INVENTION

It is therefore a primary object of the present invention to obviate the disadvantages of the prior art as described above and to provide an improved linear motion rolling-contact bearing assembly.

Another object of the present invention is to provide an improved linear motion rolling contact bearing assembly light in weight and thus suitable for high speed operation and yet high in rigidity as well as in accuracy.

A further object of the present invention is to provide an improved linear motion rolling-contact bearing assembly simple in structure and thus easy to manufacture at low cost.

A still further object of the present invention is to provide an improved linear motion rolling-contact bearing assembly using balls as rolling members.

Other objects, advantages and novel features of the present invention will become apparent from the following detailed description of the invention when considered in conjunction with the accompanying drawings.

BRIEF DESCRIPTION OF THE DRAWINGS

FIG. 9b is a perspective view showing the overall structure of the top or bottom wall section provided in the bearing assembly shown in FIG. 9a.

DESCRIPTION OF THE PREFERRED EMBODIMENTS

Figure 1:
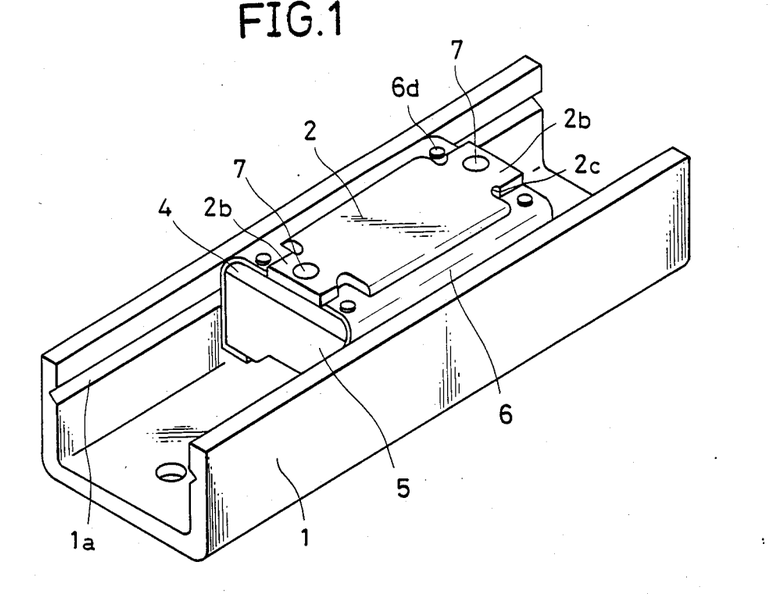
FIG. 1 is a perspective view showing the overall structure of a linear motion rolling contact bearing assembly constructed in accordance with one embodiment of the present invention.

Referring now to FIG. 1, there is schematically shown a linear motion rolling-contact bearing assembly constructed in accordance with one embodiment of the present invention. As shown, the illustrated bearing assembly includes a generally trough-shaped guide rail or bed 1 which extends straight over a desired distance, i.e., theoretically infinitely. Preferably, the guide rail 1 may be made by bending a thin steel plate to cause plastic deformation. The guide rail 1 is generally in the shape of a trough so that it includes a flat bottom wall portion and a pair of side wall portions which extend upright from both sides of the flat bottom wall portion. Accordingly, the guide rail 1 has a generally U-shaped cross section. The guide rail 1 is provided with a pair of guide grooves 1a, 1a, each of which is defined as engraved in the inner upright surface of each of the side wall portions. The pair of guide grooves 1a, 1a extends straight in parallel with the longitudinal direction of the trough-shaped guide rail 1.

Figure 2:
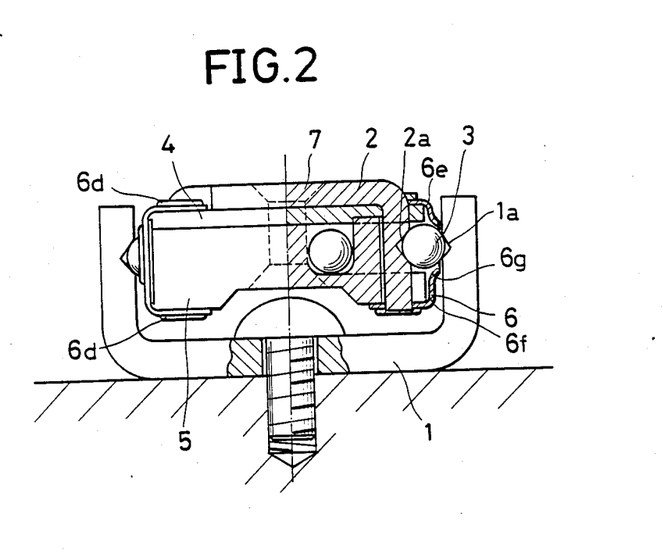
FIG. 2 is a partially sectioned front view of the bearing assembly shown in FIG. 1.

The present bearing assembly also includes a slider member including a table 2 which is generally in the shape of a rectangular block which is generally received in the interior space defined between the two opposite side wall portions of the guide rail 1. As shown in FIG. 2, the table 2 is also preferably formed by bending a thin steel plate into a desired shape to cause plastic deformation. In the illustrated embodiment, the table 2 is bent to include a flat top wall portion and a pair of side wall portions which extend downward from opposite sides of the flat top wall section. Thus, the table 2 has a cross section in the shape of an inverted-U. The width of the table 2, or the distance between the outer surfaces of the side wall sections, is determined to be somewhat smaller than the width of the guide rail 1, (i.e. the distance between the opposite inner surfaces of the side wall portions of the guide rail 1), so that the table 2 may be received in the space defined in the guide rail 1.

Figure 3:
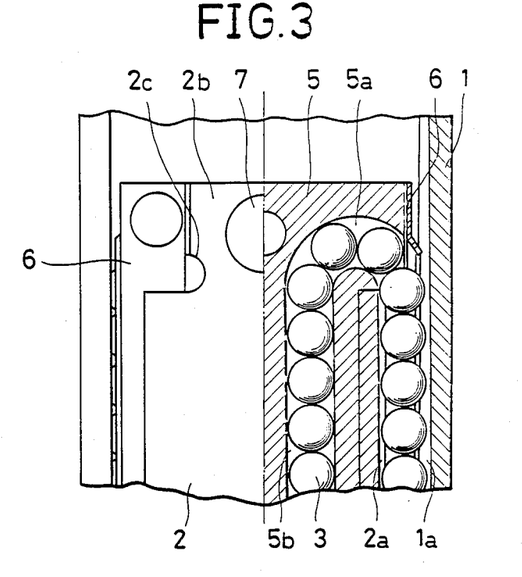
FIG. 3 is a partially sectioned, fragmentary, plan view of the bearing assembly shown in FIG. 1.
Figure 4:
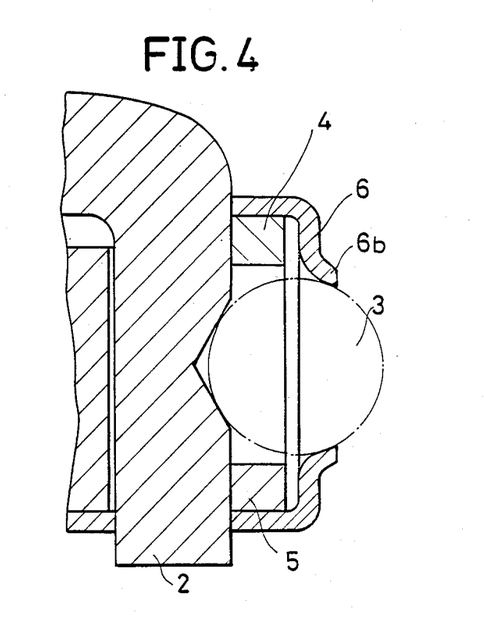
FIG. 4 is a fragmentary, cross sectional view on an enlarged scale showing part of the structure of the bearing assemby shown in FIG. 1.
Figure 6:
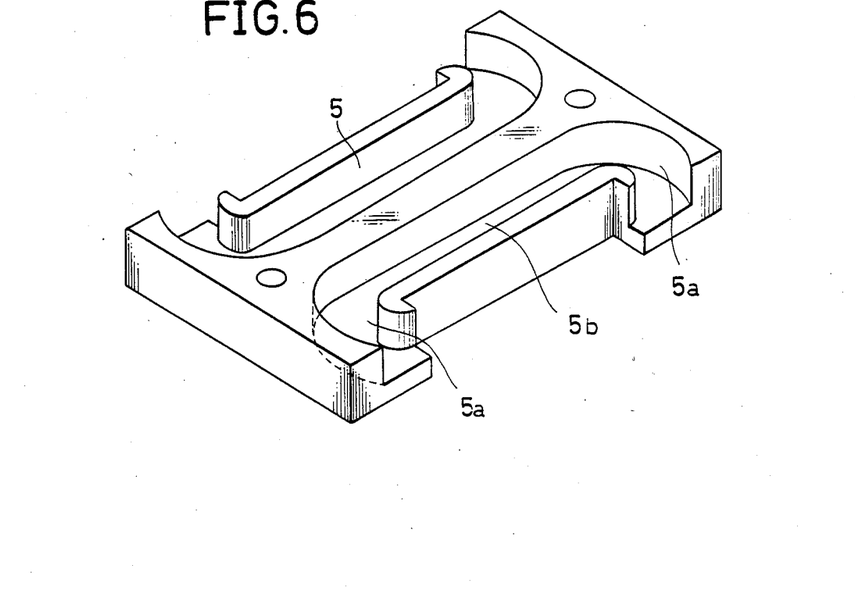
FIG. 6 is a perspective view showing the bottom wall section of the slider member of the bearing assembly shown in FIG. 1.

The slider member also includes an upper wall section 4 and a lower wall section 5, which are assembled together and fixedly attached to the table 2 to form an integrated structure. As shown in FIGS. 2 and 3, an endless circulating path is defined around each of the side wall sections of the table 2, in which balls 3 as rolling members are provided. As best shown in FIGS. 2 and 4, the outer surface of each of the side wall sections of the table 2 is provided with a groove 2a which extends straight in parallel with and opposite to the corresponding groove 1a of the guide rail 1 when the slider member is set in position inside of the guide rail 1. Thus, the outer groove 1a and its corresponding inner groove 2a define a load section of the endless circulating path in which the balls 3 are in rolling contact with both the inner and outer grooves 1a and 2a. In the illustrated embodiment, as best shown in FIG. 6, the lower wall section 5 is formed with a pair of non-load sections 5, 5 of the endless circulating paths and the non-load section 5 serves to receive the balls 3 from one end of the load section and to supply the balls 3 to the other end of the load section. The non-load section 5b thus includes a straight return section and a pair of curved sections 5a, 5a each connecting the corresponding ends of the load and return sections. The upper and lower wall members 4 and 5 are preferably comprised of a plastic material formed, for example, by injection molding.

Figure 5:
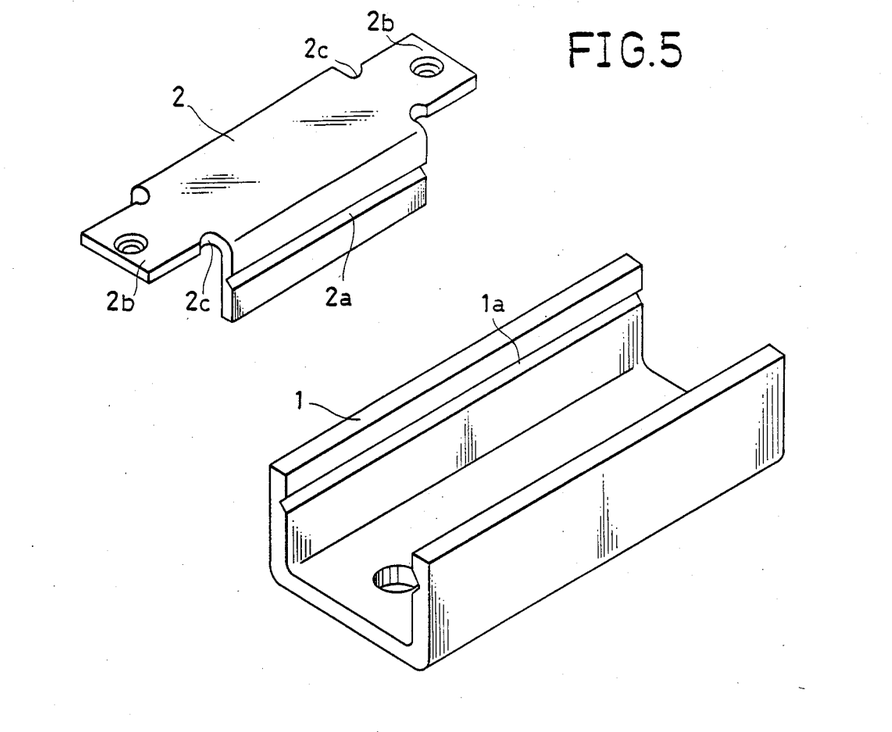
FIG. 5 is an exploded view showing the top wall section of the slider member and the guide rail of the bearing assembly shown in FIG. 1.

In the illustrated embodiment, the upper wall section 4 is a generally rectangular flat plate, and it is placed on the top surface of the lower wall section 5 so that the non-load section 5 of each of the endless circulating paths is covered thereby keeping the balls 3 in the defined path. As best shown in FIG. 5, the table 2 is provided with a pair of end projections 2b, 2b, each projecting from the corresponding end of the top flat wall portion in the longitudinal direction a through-hole is formed in each of the end projections 2b. As also shown in FIG. 5, a cut-way or relief section 2c is formed at the base end of the end projections 2b on both sides, which contributes to deforming a thin steel plate into a saddle-like shape (as shown) with increased accuracy. Thus, a sub-assembly of the upper and lower wall sections 4 and 5 is fitted onto the table 2 as interposed between its side wall portions, and rivets 7, 7 are planted into the upper and lower wall sections 4 and 5 through the respective holes formed in the end projections 2b, 2b, as shown in FIG. 1. Thus, the pair of rivets 7, 7 serve to hold the table 2 and the upper and lower wall sections 4 and 5 in an integrated structure.

Figure 8A:
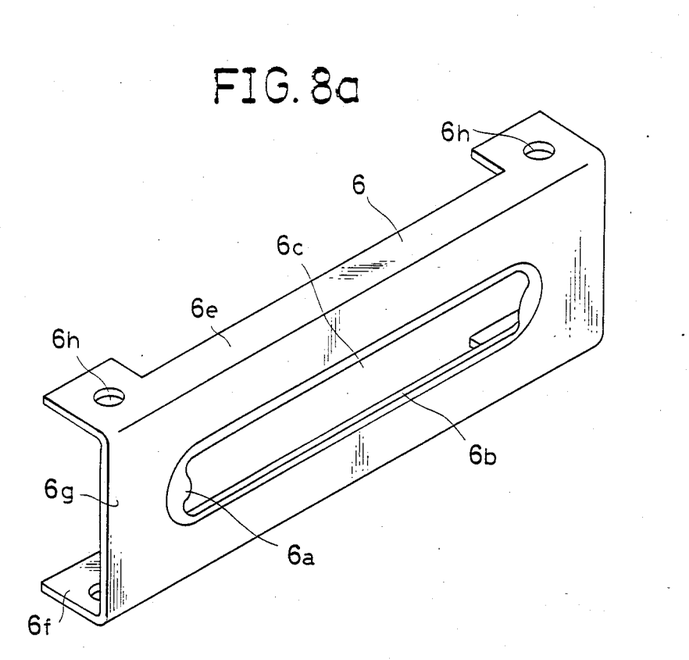
FIG. 8a is a perspective view showing the overall structure of the retainer provided in the bearing assembly shown in FIG. 1.

The slider member further includes a pair of retainers 6, 6 which are provided to clamp the upper and lower wall sections 4 and 5 together. FIG. 8a shows in perspective view the overall structure of the retainer 6 used in the bearing assembly shown in FIG. 1. As shown in FIG. 8a, the retainer 6 is generally in the shape of C or inverted-C, and thus it includes a vertical wall section 6g and a pair of top and bottom horizontal wall sections 6e and 6f which extend horizontally along and from top and bottom edges of the vertical wall section 6g. As best shown in FIG. 2, these horizontal wall sections 6e and 6f engage with the upper and lower wall sections 4 and 5 in a clamped manner so that the retainer 6 serves to hold the upper and lower wall sections 4 and 5 together. In addition, the vertical wall section 6g of the retainer 6 is formed with an elongated slot 6c extending in parallel with the longitudinal direction of the assembly. The retainer 6 is also provided with a pair of guide tongues 6a, 6a at both ends of the guide slot 6c and a pair of side guides 6b, 6b which are curved slightly outward along the top and bottom edges of the slot 6c. Thus, the balls 3 in the load section of the endless circulating path defined between the inner and outer guide grooves 1a and 2a are retained on the side of the slider member, and their movement along the load section is guided by the guide tongues 6a, 6a and the side guides 6b, 6b. Accordingly, the balls 3 move smoothly into the load section as guided by the corresponding guide tongue 6a, roll along the slot 6c guided by the side guides 6b, 6b and move smoothly into the non-load section as guided by the other guide tongue 6a. Since the upper and lower wall sections 4 and 5 are preferably comprised of a plastic material, for example by injection molding at high accuracy, the upper and lower wall sections 4 and 5 are preferably formed with positioning projections 6d, which are fitted into mounting holes 6h of the retainer 6 and thermally caulked, as best shown in FIGS. 1 and 2.

In the illustrated embodiment, the size of the non-load path section 5a, 5b defined in the lower wall section 5 is formed to be slightly larger than the diameter of the balls 3 so that the balls 3 can roll along the non-load path section smoothly. It is to be noted that, as best shown in FIG. 6, the return path section 5b and the pair of curved connecting path sections 5a, 5a are continuously formed in the same lower wall section 5 so that the movement of the balls 3 along this non-load section of the endless circulating path is extremely smooth.

Figure 7A:
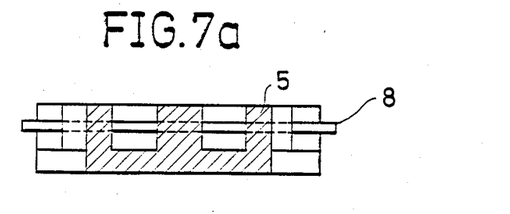
FIGS. 7a through 7d are illustrations showing an alternative structure suitable for use as the bottom wall section of the bearing assembly shown in FIG. 1.
Figure 7B:
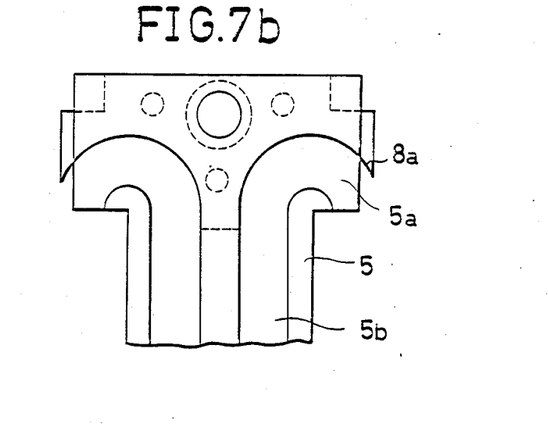
Figure 7C:
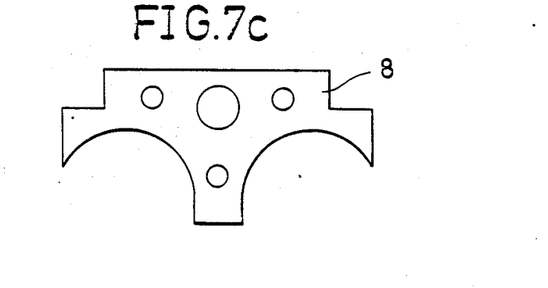
Figure 7D:
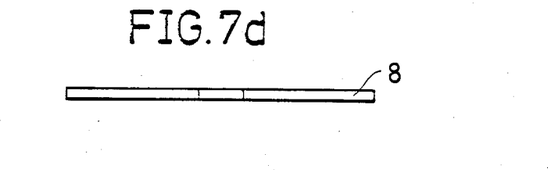
Figure 8B:
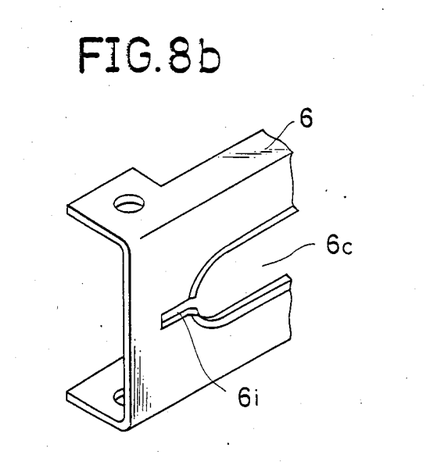
FIG. 8b is a fragmentary, perspective view showing the structure of an alternative embodiment suitable for use as the retainer provided in the bearing assembly shown in FIG. 1 together with the structure shown in FIGS. 7a through 7d.

FIGS. 7a through 7b show an alternative embodiment of the lower wall section 5. In this embodiment, an end guide plate 8 is integrally formed at each end of the lower wall section 5. Such an end guide plate 8 may be integrally formed in the lower wall section 5 as molded therein, for example, by placing the end guide plate 8 as an insert in a mold when the lower wall section 5 is formed by injection molding. As shown in FIGS. 7c and 7d, the end guide plate 8 is provided with a pair of curved edges which are commensurate with the curvature of the curved connecting sections 5a, 5a formed in the lower wall section 5. The end guide plate 8 is preferably located at a height that corresponds to the center of the balls 3 rolling along the non-load section 5a, 5b, as shown in FIG. 7a. In addition, the end guide plate 8 is provided with extended side guide section 8a which extends beyond the side of the lower wall section 5 over a predetermined distance thereby defining an extended curved guide for the balls 3 moving along the curved connecting path section 5a. With the provision of such an extended side guide section 8a, the balls 3 may move into and out of the non-load section smoothly. FIG. 8b shows a modified structure of the retainer 6 which is to be used in combination with the lower wall section 5 shown in FIGS. 7a through 7d. In FIG. 8b, the retainer 6 is formed with a pair of end slits 6i located at each end of the slot 6c in place of the guide tongues 6a. Thus, when assembled, the extended side guide section 8a of the lower wall section 5 shown in FIGS. 7a through 7d is fitted into the corresponding slit 6i. Such a structure is advantageous not only because it can guide the balls 3 smoothly, but also because it can provide an enhanced integrity to the asembly. Another advantage of this structure is the increased accuracy in the shape of the retainer 6 when formed without the projecting guide tongues 6a, 6a formed by bending part of the thin steel plate from which the retainer 6 is fabricated.

Figure 9A:
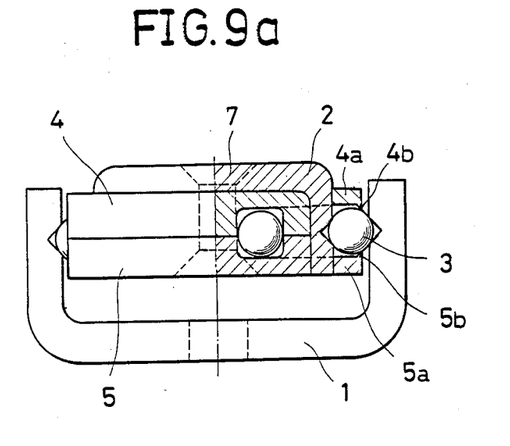
FIG. 9a is a partially sectioned, front view showing a linear motion rolling contact bearing assembly constructed in accordance with another embodiment of the present invention.
Figure 9B:
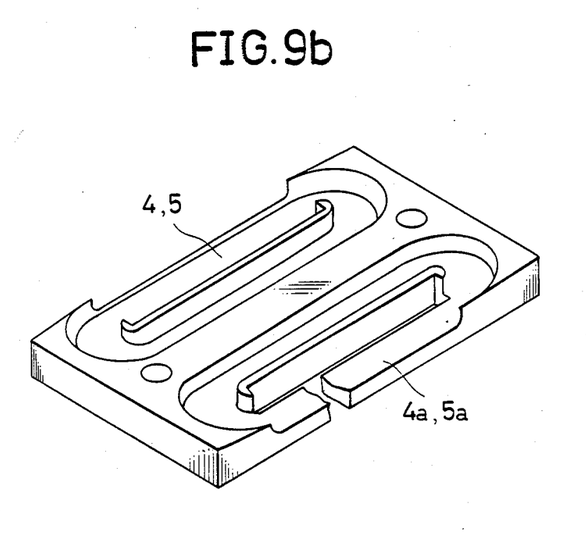

FIG. 9a shows another embodiment of the present invention in which the upper and lower wall sections 4 and 5 are identically structured and assembled together symmetrically in a mirror image relation with respect to the line of contact. The overall structure of the upper and lower wall sections 4, 5 is shown in FIG. 9b. Since the upper and lower wall sections 4 and 5 are identically shaped, only the lower wall section 5 will be decribed below. As shown in FIG. 9b, the lower wall section 5 is somewhat extended in the transverse direction which is normal to the longitudinal direction of the lower wall sections. Thus, the lower wall section is formed not only with the non-load section of the endless circulating path but also with a substantial part of the load section of the endless circulating path. The width of the side extension defining the load section formed in the lower wall section 5 is larger than half of the diameter of the balls 3 so that the balls 3 are adequately supported on this side extension defined in the lower wall section 5. As best shown in FIG. 9a, the outer edge of this side extension is further formed with a ridge 4b which projects upward from the bottom of the recess defining the endless path. Thus, ridge 4b effectively functions as a retainer for retaining the balls 3 moving along the load section defined between the top and bottom side extensions when the upper and lower wall sections 4 and 5 are assembled. With this structure, therefore, there is no need to provide a separate retainer for retaining the balls 3 in position. It is to be noted that the side extension is constructed so that the balls 3 in this section are partly exposed (FIG. 9a) so that the balls 3 moving in the load section of the endless path come into rolling contact with the guide groove formed in the guide rail 1. In this case, the table 2 and the upper and lower wall sections 4 and 5 may be joined by means of rivets or bolts, or by using an adhesive or pin connectors, as is well known for one skilled in the art.

As described in detail above, in accordance with the present invention, the table 2 and the upper and lower wall sections 4 and 5 are combined to define an integrated structure. Thus, increased positional accuracy and increased smoothness in the movement of the balls 3 with less sliding resistance. In the embodiments using the retainer 6, which clamp the upper and lower wall sections 4 and 5 fixedly, the structural integrity is enhanced over the embodiment in which upper and lower wall sections 4 and 5 are joined by rivets, bolts, adhesives, or pins. Furthermore, the assembling may simply be carried out by fixedly attaching a sub-assembly of the upper and lower wall sections to the table, arranging the balls 3 in the endless circulating paths and having the retainers 6 clamped to the sub-assembly of the upper and lower wall sections 4 and 5. In addition, the connection between the table 2 and the upper and lower wall sections is made at the end projection 2b of the table 2 so that the adverse effect of pressure between the table 2 and the upper and lower wall sections 4 and 5 is prevented from decreasing the positional accuracy of the endless circulating paths as much as possible. Since the upper and lower wall sections 4 and 5 may be advantageously formed from a plastic material and the retainers 6 and the end guide plates 8 may be advantageously formed from a lightweight metal, such as aluminum, the entire assembly can be made extremely light in weight while maintaining high dimensional accuracy.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact bearing assembly, comprising:
   a rail extending straight over a length, having a U-shaped cross section and first guide means;
   a slider member including at least one endless circulating path comprised of a load path section and a non-load path section, said slider member being provided with second guide means located at said load path section and opposite to said first guide means, said slider member also including a table having an inverted-U-shaped cross section as received in said rail and an upper wall section and a lower wall section which are fixedly attached to said table by means of fixing means and which includes said non-load path section as defined therein;
   a plurality of rolling members provided in said endless circulating path so that said rolling members are in rolling contact with said first and second guide means at said load section thereby providing a relative motion between said slider member and said rail; and
   retaining means for retaining said plurality of rolling members in said endless circulating path while said plurality of rolling members are rolling along said load section.

2. The assembly of claim 1 wherein said table is generally saddle-shaped and includes at least one end projection which projects in the lengthwise direction of said assembly from the corresponding end of a top flat portion and which is provided with a through-hole, and said fixing means extends into said upper and lower wall sections thereby forming an integrated structure among said table and said upper and lower wall sections.

3. The assembly of claim 2 wherein said fixing means includes a rivet planted into said upper and lower wall sections through said through-hole.

4. The assembly of claim 3 wherein said end projection is provided one at each of opposite ends of said table and said through-hole is provided in each of said end projections, whereby said rivet is planted into said upper and lower wall sections through the corresponding one of said through-holes.

5. The assembly of claim 1 wherein said retaining means includes a retainer plate which is mounted at each side of said slider member as clamping said upper and lower wall sections, said retainer plate being provided with an elongated slot extending in parallel with the longitudinal direction and having a width slightly smaller than the size of said plurality of rolling members thereby allowing to keep said plurality of rolling members located in said load section of said endless circulating path.

6. The assembly of claim 5 wherein said retainer plate is provided with a pair of guide tongues each of which is provided at one end of said elongated slot thereby allowing said plurality of rolling members to move between said load and non-load path sections.

7. The assembly of claim 5 wherein said upper and lower wall sections are formed with mounting projections and said retainer plate is provided with mounting holes which are brought into engagement with said mounting projections correspondingly so as to have said retainer plate clamped in position.

8. The assembly of claim 7 wherein said upper and lower wall sections are formed from a plastic material and said mounting projections are thermally caulked.

9. The assembly of claim 5 wherein said lower wall section is formed with a recess which defines said non-load path section which includes a return path section and a pair of curved connecting path sections each of which communicates with the corresponding ends of said load and return path sections.

10. The assembly of claim 9 wherein said lower wall section is integrally provided with an end guide plate which is provided with a curved edge in commensurate with the curvature of said curved connecting path and which is provided with an extended side guide portion which extends beyond the side of said lower wall section over a predetermined distance thereby providing an extended guide for the movement of the rolling members passing between said load path section and the corresponding one of said curved connecting path sections.

11. The assembly of claim 10 wherein said retainer plate is provided with a slit at each end of said elongated slot and said extended side guide portion of said end guide plate fits into said slit when assembled thereby providing an increased structural integrity.

12. The assembly of claim 1 wherein said rail is formed from a thin steel plate by bending it generally into the shape of a trough so as to have a U-shaped cross section and said first guide means is formed by a groove formed in the inside surface of each upstanding wall of the trough-shaped rail.

13. The assembly of claim 12 wherein said table is formed from a thin steel plate by bending it generally into the shape of a saddle so as to have an inverted-U-shaped cross section and said second guide means is formed by a groove formed in the outside surface of each of depending walls of the saddle-shaped table.

14. The assembly of claim 1 wherein said upper and lower wall sections are identically structured and put together symmetrically in a mirror image relation at a surface of contact therebetween.

15. The assembly of claim 14 wherein said load path section is also substantially defined between said upper and lower wall sections, and said retaining means includes a pair of ridges each formed at the side of each of said upper and lower wall sections.

* * * * *